United States Patent
Schaller et al.

(10) Patent No.: US 12,241,528 B2
(45) Date of Patent: Mar. 4, 2025

(54) BALL SCREW DRIVE WITH AN ANTI-ROTATION SAFEGUARD

(71) Applicant: KNORR-BREMSE Systeme fuer Nutzfahrzeuge GmbH, Munich (DE)

(72) Inventors: Sebastian Schaller, Langweid (DE); Steffen Groessl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 425 days.

(21) Appl. No.: 17/431,955

(22) PCT Filed: Jan. 28, 2020

(86) PCT No.: PCT/EP2020/052003
§ 371 (c)(1),
(2) Date: Aug. 18, 2021

(87) PCT Pub. No.: WO2020/169309
PCT Pub. Date: Aug. 27, 2020

(65) Prior Publication Data
US 2022/0154808 A1    May 19, 2022

(30) Foreign Application Priority Data
Feb. 19, 2019  (DE) ............ 10 2019 104 125.2

(51) Int. Cl.
*F16H 25/22* (2006.01)
*F16H 25/24* (2006.01)

(52) U.S. Cl.
CPC ..... *F16H 25/2454* (2013.01); *F16H 25/2204* (2013.01)

(58) Field of Classification Search
CPC .......... F16H 25/2454; F16H 25/2204
See application file for complete search history.

(56) References Cited

U.S. PATENT DOCUMENTS 8,656,798 B2 * 2/2014 Kawahara ............ F16H 25/20
74/89.32
9,222,556 B2 * 12/2015 Schlecht ............ F16H 25/20
(Continued)

FOREIGN PATENT DOCUMENTS

CN    1761822 A    4/2006
CN    2900933 Y  *  5/2007
(Continued)

OTHER PUBLICATIONS

International Preliminary Report on Patentability (PCT/IB/326 & PCT/IB/373) issued in PCT Application No. PCT/EP2020/052003 dated Sep. 2, 2021, Including English translation (German-language Written Opinion (PCT/ISA/237), filed on Aug. 18, 2021) (nine (9) pages).

(Continued)

*Primary Examiner* — Randell J Krug
(74) *Attorney, Agent, or Firm* — Crowell & Moring LLP

(57) ABSTRACT

An anti-rotation safeguard of an axially moving element is provided with an anti-rotation safeguard, the anti-rotation safeguard being suited for use in a ball screw drive in an automated manual transmission. The ball screw has nut which rotates on balls on a spindle, at least one securing element protruding radially from the spindle, and at least one guide element with a longitudinal a groove which guides the securing element. During translation of the spindle, rotation of the spindle is prevented by the securing element in the guide element groove. The guide element is accommodated in a cutout of the ball screw drive enclosure and can rotate about its longitudinal axis so that force transfer from the securing element to the groove is over a large surface area to reduce wear of the groove and of the securing element.

13 Claims, 3 Drawing Sheets

(56) References Cited

U.S. PATENT DOCUMENTS

| | | | |
|---|---|---|---|
| 9,890,840 B2* | 2/2018 | Ohnishi | ............... F16H 25/24 |
| 2007/0029147 A1 | 2/2007 | Macke et al. | |
| 2011/0265588 A1* | 11/2011 | Schlecht | ............... F16H 25/20 |
| | | | 74/89.32 |
| 2012/0247240 A1 | 10/2012 | Kawahara et al. | |
| 2015/0285347 A1* | 10/2015 | Ohnishi | .............. F16H 25/2204 |
| | | | 74/89.36 |
| 2021/0332882 A1* | 10/2021 | Schaller | ............... F16H 61/28 |

FOREIGN PATENT DOCUMENTS

| | | | | |
|---|---|---|---|---|
| DE | 202006014177 U1 * | 12/2006 | ........... | B25B 27/023 |
| DE | 10 2008 051 544 B4 | 12/2012 | | |
| DE | 102011119724 A1 * | 6/2013 | ............. | B62D 5/001 |
| DE | 102015209600 A1 * | 12/2016 | ................ | F16F 1/36 |
| EP | 2 908 028 A1 | 8/2015 | | |
| JP | 2014-80993 A | 5/2014 | | |
| JP | 2016-53417 A | 4/2016 | | |
| WO | WO-2017005258 A1 * | 1/2017 | ......... | F16H 25/2252 |

OTHER PUBLICATIONS

Japanese-language Office Action issued in Japanese Application No. 2021-548595 dated Feb. 21, 2023 with English translation (six (6) pages).

Japanese-language Office Action issued in Japanese Application No. 2021-548595 dated Sep. 6, 2022 (four (4) pages).

International Search Report (PCT/ISA/210) issued in PCT Application No. PCT/EP2020/052003 dated Apr. 15, 2020 with English translation (four (4) pages).

German-language Written Opinion (PCT/ISA/237) issued in PCT Application No. PCT/EP2020/052003 dated Apr. 15, 2020 (five (5) pages).

German-language Office Action issued in German Application No. 10 2019 104 125.2 dated Dec. 10, 2019 (six (6) pages).

Chinese-language Office Action issued in Chinese Application No. 202080015350.9 dated Apr. 28, 2023 with partial English translation (7 pages).

\* cited by examiner

BALL SCREW DRIVE WITH AN ANTI-ROTATION SAFEGUARD

BACKGROUND AND SUMMARY OF THE INVENTION

The present invention relates to an anti-rotation safeguard of an axially moving element and to a ball screw drive with an anti-rotation safeguard in particular for use in an automated manual transmission (AMT) for conversion of rotational movement into translational movement.

Electrically driven actuators can be used for the actuation of clutches and gears in AMT transmissions. The rotational output movement generated by an electric motor is in this case generally first of all translated in a transmission ratio stage and subsequently converted into a translational movement. For the latter step, use is often made of ball screw drives in practice.

Said ball screw drives generally consist of a spindle with a raceway profile, balls located in the raceway profile and a nut which, with the aid of the balls, rotates with little friction about the spindle. In this case, the spindle slides on the balls in the raceway profile in the longitudinal direction thereof through the inner diameter of the nut. Said ball screw drive also has a ball return system which balls at locations where they would run out of the contact area between the nut and the spindle on account of the movement of the nut and the spindle are returned again to locations where balls are required for the purpose of reducing friction. Expressed otherwise, said ball return system thus ensures that balls are always located between the nut and the spindle in order to thus be able to ensure that there is as little friction between the nut and the spindle as possible.

Furthermore, it is necessary to ensure that the spindle does not also rotate as a result of the rotation of the nut. This is achieved by means of an anti-rotation safeguard of the spindle. The anti-rotation safeguard is usually achieved by means of a form fit between the spindle and an enclosure of the ball screw drive. In order to implement the anti-rotation safeguard, the prior art generally provides a transverse bolt in the spindle, said transverse bolt protruding beyond the spindle in the radial direction and being guided, along the actuating direction, in elongate grooves suitable therefor in the enclosure. In this way, although the spindle is able to move in the longitudinal direction, its rotational degree of freedom is blocked by the anti-rotation safeguard.

However, an implementation of this kind has the disadvantage that there is considerable wear between the securing element and the groove of the enclosure as a result of tolerances, different friction pairings and non-uniform surface pressure. Even a small amount of play between the securing element and the enclosure has the effect that a rotational movement of the nut also leads to a small rotational movement of the spindle until the contact of the securing element with the enclosure stops the rotational movement of the spindle.

In the described arrangement of the prior art, this operation has the effect that the contact area of the securing element with the enclosure, more precisely with the side surface of the groove of the enclosure, in which groove the securing element is guided, is very small, as a result of which there is a high degree of wear both of the side surface of the groove and of the securing element.

It is thus an object of the present invention to provide a solution which reduces the wear of a described arrangement, and thus to achieve longer service lives of the components and lower costs for maintenance work.

This object is achieved by the subjects according to the invention of the independent claims. Advantageous embodiments are contained in the dependent claims.

An anti-rotation safeguard according to the invention has a securing element, which is arranged on a movement element which is configured to move along its longitudinal axis, that is to say in the longitudinal direction, and to perform no rotational movement in the process. In this respect, the securing element at at least one location protrudes radially outwardly from the surface of the movement element.

Furthermore, the anti-rotation safeguard according to the invention has at least one guide element, which is in turn provided with a groove. Here, groove denotes an elongate recess in the guide element, said recess being able to have any cross-sectional shapes and being provided to receive the securing element. The at least one guide element with the groove is in this case arranged in a cutout of an enclosure of the movement element in such a way that the groove lies substantially parallel to the longitudinal axis of the movement element and guides that part of the securing element which protrudes from the surface of the movement element in the case of a longitudinal movement of the movement element. If the movement element is subjected to a torque that would lead to a rotation of the movement element about its own longitudinal axis, this movement is prevented by the engagement of the securing element in the groove of the guide element. The at least one guide element also does not have any open degrees of freedom along the longitudinal axis of the groove, but does have at least one open degree of freedom for rotation about an axis parallel to the longitudinal axis of the groove.

As a result of the open rotational degree of freedom, it is possible for the guide element to be oriented, depending on the rotation of the movement element and thus of the securing element, on the securing element by way of the force exerted on the guide element by said securing element. In this way, the contact area between the securing element and the guide element is increased, as a result of which the wear of the components involved can be reduced.

In an advantageous embodiment and in order to realize a solution with as small an installation space as possible, the securing element is arranged at an end or in an end region of the movement element. In this way, an axially protruding portion of the spindle can be avoided and an unnecessary enlargement of the installation space of the device overall can be prevented.

Furthermore, in an advantageous embodiment, the number of guide elements corresponds to the number of locations where the at least one securing element radially protrudes from the surface of the movement element. This embodiment has the advantage that each end of the at least one securing element that contributes to the anti-rotation safeguard has a respective guide element and, as a result, an optimal orientation of the respective guide element can be ensured. On the other hand, this ensures that only the required number of guide elements are installed, which saves on machining outlay and costs.

In a further advantageous embodiment, the cross section of the groove of the at least one guide element perpendicularly with respect to the longitudinal axis of the guide element has the same shape as the cross section, perpendicularly with respect to the longitudinal axis of the movement element, through that part of the securing element which protrudes into the groove of the guide element. In this case, a plurality of locations of the securing element may protrude into the groove and a plurality of securing elements and guide elements may be provided.

In a further advantageous embodiment of the invention, the anti-rotation safeguard has at least 2 guide elements which are preferably arranged uniformly around the movement element, in order to thereby at least halve the force to be absorbed by the at least one guide element for each guide element and thus reduce the wear in each individual guide element.

Furthermore, an embodiment of the securing element as a bolt is advantageous. This means that the cross section of the at least one securing element perpendicularly with respect to the longitudinal axis of the securing element has a circular shape at a location where the securing element protrudes into the groove of the guide element.

In a further advantageous embodiment, the at least one guide element is rotatably mounted at its end faces or at its ends in the enclosure. By way of such a mounting, any movement of the guide element in the enclosure is prevented, apart from the rotation about an axis which is defined by the mounting and runs parallel to the longitudinal axis of the movement element. Such an embodiment has the advantage that the friction between the guide element and the enclosure is minimized during the orientation of the guide element with respect to the securing element, and thus the wear on the components involved can be reduced.

In a further advantageous embodiment of the invention, the at least one guide element is arranged in the cutout of the enclosure in such a way that a movement of the guide element in its longitudinal direction is restricted on the one hand by the abutment against the enclosure and a movement of the guide element in the opposite direction is prevented by a securing ring, such that the guide element cannot move in the longitudinal direction.

Furthermore, an embodiment in which the guide element has a symmetrical, preferably circular cross section perpendicularly with respect to its longitudinal axis is advantageous. In particular, a circular cross section makes it possible to guarantee a small installation space and simple implementation of the invention.

In a further advantageous embodiment, the guide element and the cutout of the enclosure, in which the guide element is accommodated, have the same cross-sectional shape perpendicularly with respect to the longitudinal axis of the guide element. Such an embodiment thus does not take up a larger installation space than anti-rotation safeguards according to the prior art.

In a further advantageous embodiment, the groove of the at least one guide element has a symmetrical cross section in the longitudinal direction of the groove.

In addition, in an advantageous embodiment, the material of the at least one guide element and the material of the at least one securing element produce a material pairing which, in the case of friction between the materials, has low wear and/or low frictional resistance. The material of the at least one guide element is in this case preferably composed of a hard material such as for example a hard steel. In this way, increased wear of the groove and of the at least one securing element can be avoided and low maintenance outlay ensured.

Furthermore, an embodiment of the invention in which the end of the securing element protrudes into the groove to such an extent that that point of the securing element which comes into contact with one of the side surfaces of the groove during a rotation of the securing element due to a rotation of the movement element is further away from the surface of the spindle than the central point of the cross section of the guide element perpendicularly with respect to its longitudinal axis is advantageous.

A ball screw drive according to the invention has a spindle with a raceway profile and a defined outer diameter, and a nut with a defined inner diameter which is slightly larger than the outer diameter of the spindle. Furthermore, said ball screw drive contains at least two balls which are arranged between the nut and the spindle in the raceway profile thereof, in order to permit low-friction movement between the spindle and the nut. In this arrangement, the spindle moves in the longitudinal direction when the nut rotates about the spindle. In this case, the longitudinal axes of the nut and of the spindle are superposed, and the nut rotates about the spindle without moving in the longitudinal direction.

In order to prevent a rotational movement of the spindle, the ball screw drive is provided with an anti-rotation safeguard according to the invention, wherein the spindle of the ball screw drive is the movement element of the anti-rotation safeguard. The securing element, which is arranged on the spindle, therefore engages by way of its protruding ends in the groove of the guide element, which is arranged opposite the spindle, and is guided therein. In this case, the guide element is arranged, as described above, in an enclosure of the spindle.

The reverse kinematic arrangement of the ball screw drive explained above constitutes a further ball screw drive according to the invention. In such an embodiment, the spindle rotates about its own longitudinal axis, without moving in the axial direction. As a result, the nut undergoes an axial, that is to say translational movement, for which rotation of said nut has to be prevented in this case. The anti-rotation safeguard is thus provided on the nut, as a result of which said nut constitutes the movement element of the anti-rotation safeguard in this ball screw drive. The at least one guide element with the groove in which the securing element is guided is consequently arranged opposite the nut in the enclosure of the ball screw drive of this embodiment. The securing element can thus be guided in the groove of the guide element in the case of a translational movement, and rotation of the nut is prevented.

The invention is explained in more detail below with reference to figures.

DETAILED DESCRIPTION OF THE DRAWINGS

Figure 1:
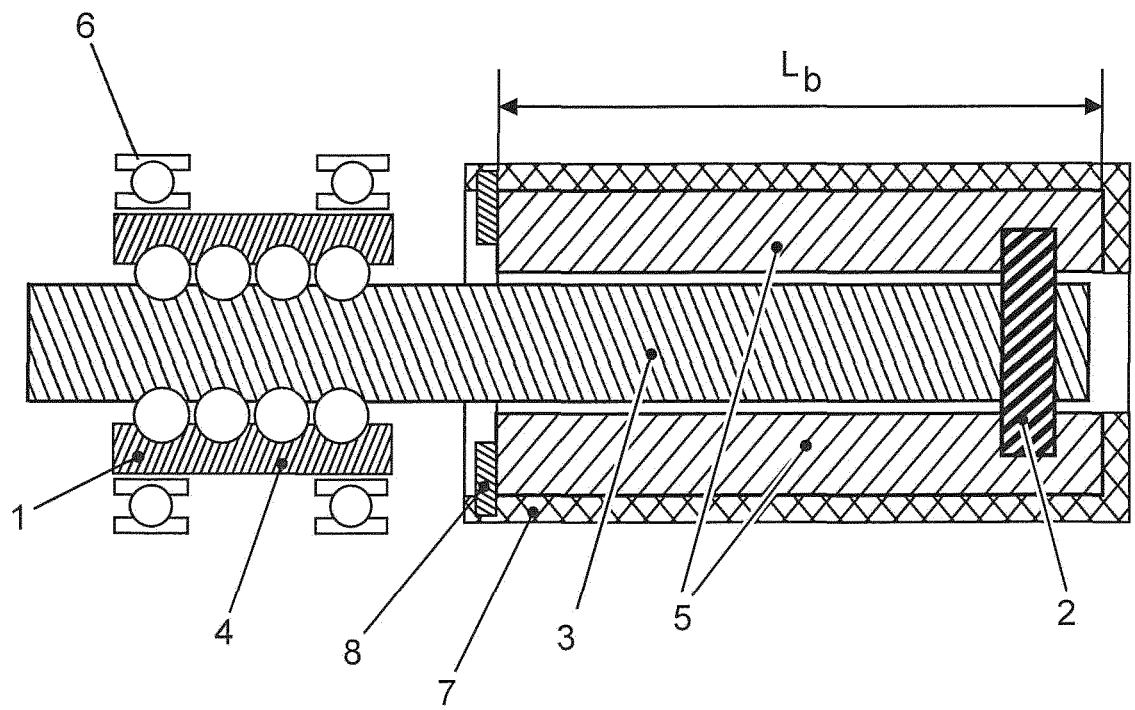
FIG. 1 shows a schematic sketch of the structure of an embodiment of the ball screw drive according to an embodiment of the present invention.

FIG. 1 shows a schematic view of the structure of an embodiment of the ball screw drive according to the invention with an anti-rotation safeguard. The central components of the ball screw drive 1 are the spindle 3 and the nut 4 which rotates about the longitudinal axis of the spindle. In this case, balls are arranged between the nut and the spindle, in order to ensure that the nut 4 rotates with as little friction as possible. The balls are in this case guided in a raceway profile (not illustrated in FIG. 1) in the spindle 3. The nut 4 is mounted, with respect to its outer diameter, in a rotational manner by way of the ball bearings 6, such that a rotational movement of the nut 4 about the spindle 3 is possible, but a movement of the nut 4 in the longitudinal direction of the spindle 3 is prevented.

If the nut 4 is set in rotation by, for example, an electric motor (not illustrated), the rotational movement of the nut 4 is converted by the balls guided in the raceway profile of the spindle 3 into a translational movement (to the right or left in the plane of the drawing) of the spindle 3. Since the balls would move along the raceway profile out of the region between the nut 4 and the spindle 3 due to the rotational movement of the nut 4 and the resulting translational movement of the spindle 3, the balls have to be returned from one end of the nut 4 to the other end. This is effected by means of a return system, which is not illustrated and which is known from the prior art, within the nut 4.

In order to prevent rotation of the spindle 3 as a result of the dynamic rotation of the nut 4, it is necessary to prevent the rotational movement of the spindle 3 by means of an anti-rotation safeguard. In the embodiment illustrated in FIG. 1, the anti-rotation safeguard consists of three components. Firstly, provided at the end of the spindle 3, which is to be understood here as the movement element, is a securing element 2 which is arranged perpendicularly with respect to the longitudinal axis of the spindle 3. The securing element 2 furthermore has a circular cross section in a section direction perpendicular to the longitudinal axis of the securing element 2. It can thus be described as a cylindrical bolt which is perpendicular to the longitudinal axis of the spindle 3. The two ends of the bolt also radially outwardly protrude to a significant extent from the surface of the spindle 3. The end faces of the bolt are embodied as planar faces in this embodiment.

The other two components of the anti-rotation safeguard are guide elements 5, which are arranged so as to be directly opposite one another, above and below the spindle 3 in the plane of the drawing, parallel to the longitudinal axis of the spindle 3. Like the spindle 3 and the securing element 2, the guide elements 5 also have a circular cross section and can thus be described as cylinders with planar end faces.

On the side which in each case faces the spindle 3, the two guide elements 5 have a groove (not illustrated in FIG. 1), which in each case receive the ends of the securing element 2. The grooves are in this case arranged in the guide elements 5 in such a way that in the case of a translational movement of the spindle 3 to the left (in the plane of the drawing), the spindle 3 can be guided by way of the securing element 2 in the grooves over the entire actuating length $L_b$ and rotation of the spindle 3 can be avoided. The cross-sectional shapes of the grooves also correspond to the respective ends to be guided of the securing element 3 such that the cross sections of the grooves are filled as completely as possible by the ends of the securing element 2, without thereby impeding the translational movement of the securing element 2 along the grooves.

The guide elements 5 are, for their part, each arranged in a cutout of an enclosure 8 of the ball screw drive 1. In this case, the cutouts and the guide elements 5 have the same cross-sectional shape perpendicularly with respect to the longitudinal axis of the guide elements 5. It should be noted that the radius of the described cross section of the guide elements 5 is slightly smaller than the radius of the cross sections of the respective cutouts. A movement in the longitudinal direction is restricted on the one hand by the abutment of the guide elements 5 against the enclosure 8 (on the right-hand side in the plane of the drawing) and on the other hand by a securing ring 9 (on the left-hand side in the plane of the drawing). The guide elements 5 can thus rotate in their cutouts about their longitudinal axes, while a translational movement of the guide elements in the longitudinal direction is not possible.

Figure 2:
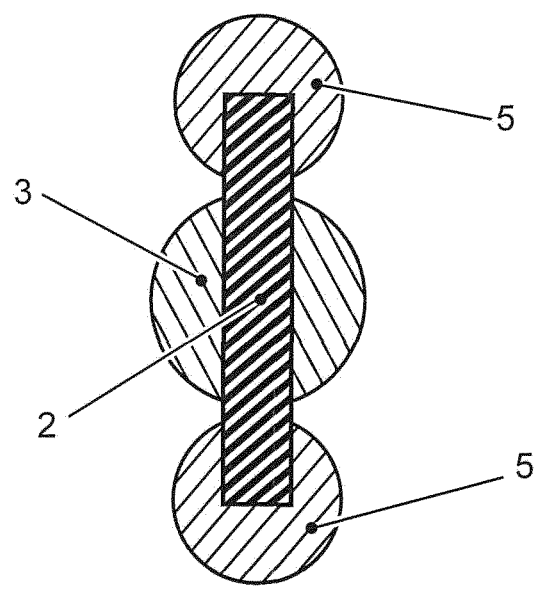
FIG. 2 shows a cross-sectional view through the securing element of the spindle, the spindle itself and two guide elements of the embodiment from FIG. 1.

FIG. 2 shows a cross-sectional view of the embodiment of the ball screw drive from FIG. 1. The section runs in this case at the level of the securing element, such that the spindle 3, the securing element 2 and the two guide elements 5 are shown. The circular cross sections of the spindle 3 and of the two guide elements 5 can be seen here. In this case, the securing element 2 engages by way of the respective ends in the groove of the guide element 5. In this view, the movement of the spindle and thus of the securing element 2 runs into and out of the plane of the drawing.

Figure 3:
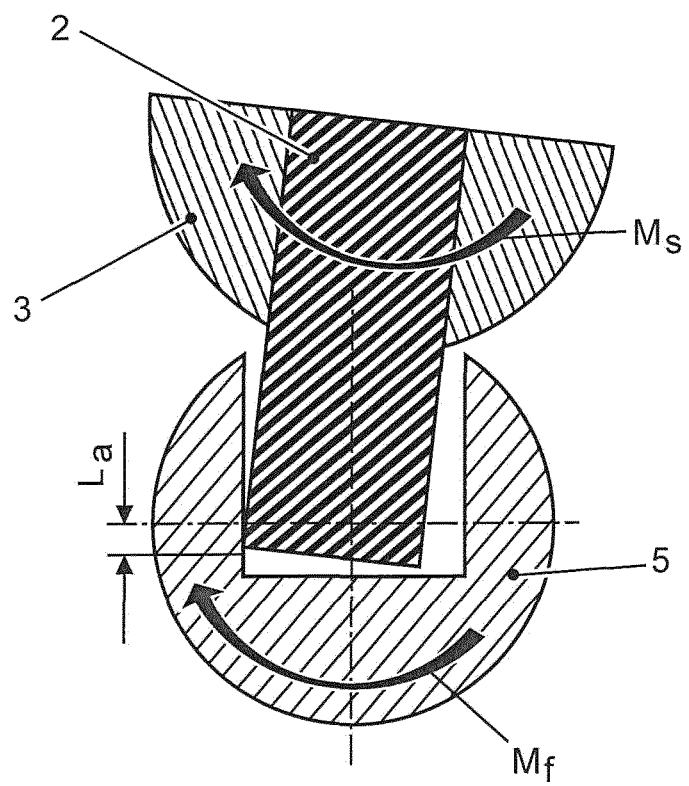
FIG. 3 shows a detail view of the cross-sectional view from FIG. 2 for illustration of the operating principle of the ball screw drive.

FIG. 3 shows a detail view of the cross-sectional view from FIG. 2, wherein only the lower guide element 5 and the lower part of the spindle 3 and of the securing element 2 are considered. It is pointed out that in order to be able to better explain the principle of the invention, the groove of the guide element 5 has been illustrated as being significantly larger than the end of the securing element 2, such that a significant amount of play can be seen between the groove and the securing element 2.

The spindle 3 and thus also the securing element 2 have a slight twist angle in relation to the guide element 5. This results from a slight rotation of the spindle 3, which has been brought about by the torque $M_s$, which in turn acts on the spindle 3 as a result of the rotation of the nut 4. Since the groove has a larger cross section than the securing element 2 in the region of the groove, the end of the securing element 2 is initially able to move in the groove. After a certain twist angle, the securing element comes into contact with a side surface of the groove (state illustrated). The contact point of the end of the securing element 2 lies in this case in the plane of the drawing below the central point of the substantially circular cross section of the guide element 5. This is indicated in FIG. 3 by the distance La between the central point of the cross section of the guide element and the contact point between the groove and the securing element 2.

After the securing element contacts the guide element, the torque $M_s$ is then transmitted to the guide element 5. Since said guide element is able to move slightly, and in particular able to rotate, in the cutout of the enclosure (not illustrated in FIG. 3) in the plane of the drawing, the torque $M_s$ of the securing element 2 leads to a torque $M_f$ of the guide element 5, which has the effect in particular that the guide element 5 rotates in the cutout.

Figure 4:
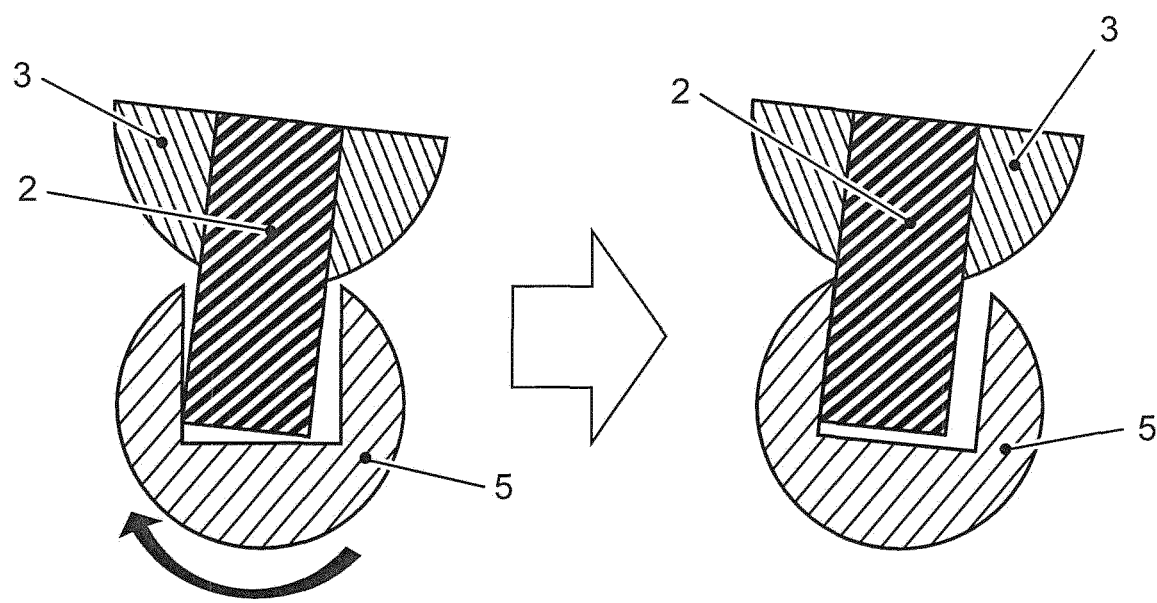
FIG. 4 shows a further detail view of FIG. 2 for illustration of the operating principle for orientation of the guide element.

FIG. 4 shows the orientation of the guide element 5 as a result of the torque $M_f$. The left-hand illustration shows the situation already described in FIG. 3. The securing element 2 is in contact with a side surface of the groove, such that the torque $M_s$ is transmitted to the guide element 5 and brings about the torque $M_f$. This leads subsequently to a rotation of the guide element 5 about an axis parallel to its longitudinal axis. The result is that the guide element 5 is oriented in such a way that the securing element 2 contacts the side surface of the groove by way of its entire side surface, which is located within the groove.

In this position, the torque $M_s$ cannot be transmitted onward to the guide element 5, as a result of which the torque $M_f$ no longer acts on the guide element 5. The rotation of the guide element 5 therefore stops, and the guide element 5 has reached its final position.

In this final position, in comparison with the position shown in the left-hand illustration, linear contact instead of punctiform contact has been produced between the securing element 2 and the guide element 5. The force acting via the torque $M_s$ of the securing element 2 is thus distributed over a larger region than in the left-hand illustration of FIG. 4.

In conventional solutions according to the prior art, as described in the introduction, a securing element is guided in a groove in the enclosure of the ball screw drive. The solution according to the prior art is thus represented by the left-hand illustration of FIG. 4. By orienting the guide element 5 (see right-hand illustration) and the accompanying introduction of force into the guide element 5 or the enclosure (not illustrated in FIG. 4) over the larger bearing surface of the securing element 2 on the side surface of the groove, it is possible to achieve lower wear between the securing element 2 and the guide element 5 and to nevertheless ensure rotation of the spindle.

Figure 5:
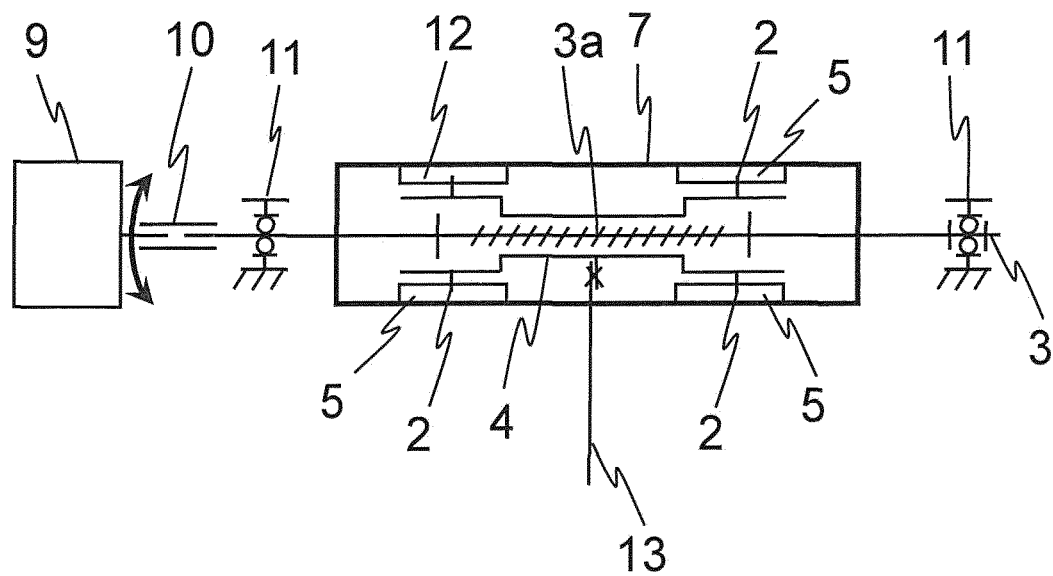
FIG. 5 shows a schematic illustration for explanation of a further embodiment of a ball screw drive with an anti-rotation safeguard according to the invention.

FIG. 5 shows a schematic illustration of a further ball screw drive with an anti-rotation safeguard according to the invention. The embodiment shown in FIG. 5 constitutes the reverse kinematic arrangement of the embodiment as per FIG. 1.

A drive device 9 is connected to a spindle 3 via a coupling 10. Said spindle has a raceway profile 3a at least on a part of its circumference and is rotatably mounted via the bearing 11. A nut 4 engages with the spindle via balls (not illustrated) inserted in the raceway profile 3a. In this case, the spindle 3 passes through the nut 4, like in the embodiment outlined above, wherein the two components are oriented coaxially with one another. The nut is also mounted in such a way that it can carry out a translational movement along the longitudinal direction of the spindle 3. The anti-rotation safeguard 12, which is arranged at the two axial ends of the nut, prevents the nut 4 from rotating. The anti-rotation safeguard according to the invention consists, as described above, of a securing element 2 and a guide element 5, wherein the securing element 2 engages in a groove of the guide element 5. The nut 4 is furthermore connected to an actuating element 13. Like in the ball screw drive of the embodiment as per FIG. 1, the guide element and groove are arranged oppositely to the securing element in a cutout of the enclosure 7.

The functioning of the ball screw drive is as follows. If the drive device 9 exerts a drive movement (rotation) on the spindle 3 via the coupling 10, the spindle is set in rotation. The form fit achieved by means of the balls between the nut 4 and the spindle 3 has the effect that the nut can move in a translational manner in an axial direction, while a rotational movement of the nut 4 can be prevented by the anti-rotation safeguard 12. It is thus possible for the actuating element to be moved parallel to a longitudinal axis of the spindle 3.

LIST OF REFERENCE DESIGNATIONS

1 Ball screw drive
2 Securing element
3 Spindle
3a Raceway profile
4 Nut
5 Guide element
6 Ball bearing
7 Enclosure
8 Securing ring
9 Drive device
10 Coupling
11 Bearing
12 Anti-rotation safeguard
13 Actuating element
Lb Actuating length
Ms Torque acting on the spindle
Mf Torque acting on the guide element

What is claimed is:

1. An anti-rotation safeguard, comprising:
   a movement element configured to move in a longitudinal direction without rotation within an enclosure;
   at least one securing element arranged on the movement element with at least one protruding part of the at least one securing element protruding radially outwardly relative to the longitudinal direction from the surface of the movement element; and
   at least one guide element arranged in a cutout of the enclosure substantially parallel to the movement element, the at least one guide element having a groove in the longitudinal direction configured to guide the at least one protruding part of the securing element during a longitudinal movement of the movement element,
   wherein the at least one guide element has no degree of freedom along the longitudinal axis of the groove, and at least a rotational degree of freedom about an axis parallel to the longitudinal direction, and
   wherein longitudinally spaced end faces of the at least one guide element are engaged and supported by the enclosure allowing rotation of the at least one guide element about an axis parallel to the longitudinal axis of the movement element without translational movement of the at least one guide element, wherein one of the end faces of the at least one guide element is directly engaged with the enclosure.

2. The anti-rotation safeguard as claimed in claim 1, wherein
   a cross section of the groove of the at least one guide element corresponds to a cross section of the at least one part of the at least one securing element protruding from the movement element.

3. The anti-rotation safeguard as claimed in claim 1, wherein
   the at least one protruding part of the at least one securing element protruding into the groove of the at least one guide element has a circular cross section perpendicular to a longitudinal axis of the at least one securing element extending in a protruding direction of the at least one protruding part.

4. The anti-rotation safeguard as claimed in claim 1, wherein
   the material of the at least one guide element is steel.

5. The anti-rotation safeguard as claimed in claim 1, wherein
   the enclosure surrounds at least the movement element, the at least one guide element is arranged in the enclosure with the one of the end faces abutting against the enclosure and the other of the end faces abutted by and fixed by a securing ring, such that the at least one guide element is constrained against movement in the longitudinal direction relative to the enclosure.

6. The anti-rotation safeguard as claimed in claim 1, wherein
   the at least one securing element protrudes into the groove of the at least one guide element such that a portion of the least one securing element in contact with one of the side surfaces of the groove during a circumferential rotation of the securing element in the groove is further away from the surface of the movement element than a center of the cross section of the guide element.

7. The anti-rotation safeguard as claimed in claim 1, wherein
the at least one guide element includes a plurality of guide elements which correspond to a number of locations where the at least one securing element radially protrudes from the surface of the movement element.

8. The anti-rotation safeguard as claimed in claim 7, wherein
the plurality of guide elements are distributed uniformly around the circumference of the movement element.

9. The anti-rotation safeguard as claimed in claim 1, wherein
the at least one guide element has a symmetrical cross section perpendicular the longitudinal direction.

10. The anti-rotation safeguard as claimed in claim 9, wherein
the symmetrical cross section is circular.

11. The anti-rotation safeguard as claimed in claim 9, wherein
the at least one guide element and the cutout of the enclosure have substantially the same cross-sectional shape perpendicular to the longitudinal direction.

12. A ball screw drive with an anti-rotation safeguard, comprising:
a spindle with a raceway profile and an outer diameter;
a nut with an inner diameter;
at least two balls arranged between the nut and the spindle in the raceway profile, the at least two balls being configured to permit movement of the spindle along a longitudinal direction of the nut without movement of the nut in the longitudinal direction;
an enclosure supporting the nut and the spindle; and
an anti-rotation safeguard, the anti-rotation safeguard including
at least one securing element arranged on the spindle with at least one protruding part of the at least one securing element protruding radially outwardly relative to the longitudinal direction from the surface of the spindle; and
at least one guide element arranged in a cutout of the enclosure substantially parallel to the spindle, the at least one guide element having a groove in the longitudinal direction configured to guide the protruding part of the securing element during a longitudinal movement of the spindle,
wherein the at least one guide element has no degree of freedom along the longitudinal axis of the groove, and at least a rotational degree of freedom about an axis parallel to the longitudinal direction, and
wherein longitudinally spaced end faces of the at least one guide element are engaged and supported by the enclosure allowing rotation of the at least one guide element about an axis parallel to the longitudinal axis of the movement element without translational movement of the at least one guide element, wherein one of the end faces of the at least one guide element is directly engaged with the enclosure.

13. A ball screw drive with an anti-rotation safeguard, comprising:
a spindle with a raceway profile and an outer diameter;
a nut with an inner diameter;
at least two balls arranged between the nut and the spindle in the raceway profile, the at least two balls being configured to permit movement of the nut along a longitudinal direction of the nut without movement of the spindle in the longitudinal direction;
an enclosure supporting the nut and the spindle; and
an anti-rotation safeguard, the anti-rotation safeguard including
at least one securing element arranged on the nut with at least one part of the at least one securing element protruding radially outwardly relative to the longitudinal direction from the surface of the nut; and
at least one guide element arranged in a cutout of the enclosure substantially parallel to the spindle, the at least one guide element having a groove in the longitudinal direction configured to guide the protruding part of the securing element during a longitudinal movement of the nut,
wherein the at least one guide element has no degree of freedom along the longitudinal axis of the groove, and at least a rotational degree of freedom about an axis parallel to the longitudinal direction, and
wherein longitudinally spaced end faces of the at least one guide element are engaged and supported by the enclosure allowing rotation of the at least one guide element about an axis parallel to the longitudinal axis of the movement element without translational movement of the at least one guide element, wherein one of the end faces of the at least one guide element is directly engaged with the enclosure.

* * * * *